(12) United States Patent
Lok et al.

(10) Patent No.: US 9,447,901 B2
(45) Date of Patent: Sep. 20, 2016

(54) RADIAL FLOW PROCESS AND APPARATUS

(71) Applicant: UOP LLC, Des Plaines, IL (US)

(72) Inventors: Ka L. Lok, Buffalo Grove, IL (US);
David A. Wegerer, Lisle, IL (US);
Jeffrey Grott, Chicago, IL (US);
William Yanez, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 111 days.

(21) Appl. No.: 14/047,149

(22) Filed: Oct. 7, 2013

(65) Prior Publication Data
US 2015/0098862 A1 Apr. 9, 2015

(51) Int. Cl.
*B01J 8/02* (2006.01)
*B01J 8/08* (2006.01)
*F16L 5/02* (2006.01)
*B01J 8/00* (2006.01)

(52) U.S. Cl.
CPC *F16L 5/02* (2013.01); *B01J 8/003* (2013.01); *B01J 8/0214* (2013.01); *B01J 8/0278* (2013.01); *B01J 2208/00752* (2013.01); *B01J 2208/00761* (2013.01)

(58) Field of Classification Search
CPC ........................... B01J 8/02; B01J 8/08
USPC ........................................... 422/600
See application file for complete search history.

(56) References Cited

U.S. PATENT DOCUMENTS

| | | | | | |
|---|---|---|---|---|---|
| 3,706,536 | A | * | 12/1972 | Greenwood et al. | 422/634 |
| 4,701,429 | A | * | 10/1987 | Greenwood | 502/37 |
| 4,977,119 | A | * | 12/1990 | Koves | 502/48 |
| 5,202,097 | A | * | 4/1993 | Poussin | 422/218 |
| 7,097,675 | B2 | | 8/2006 | Detering | |
| 7,780,928 | B2 | * | 8/2010 | Yuan | 422/211 |
| 2011/0296759 | A1 | | 12/2011 | Roychoudhury | |

* cited by examiner

Primary Examiner — Huy-Tram Nguyen (57) ABSTRACT

A flow connector creates a fluid connection between a port in a wall of a reactor vessel and an axial flow path of the reactor vessel. The flow connector has a wall defining a flow path of the flow connector. The flow path terminates in a first end opening and a second end opening. The first end opening is configured to connect to the axial flow path of the reactor vessel, and the second end opening is configured to connect to the port in a wall of the reactor. The flow connector includes a passageway extending through the wall of the flow connector to provide access to the flow path of the flow connector. A cover is dimensioned for sealing the passageway. The passageway may be dimensioned such that a person may traverse the passageway to access the flow path of the flow connector.

5 Claims, 6 Drawing Sheets

RADIAL FLOW PROCESS AND APPARATUS

BACKGROUND OF THE INVENTION

1. Field of the Invention

The present invention relates generally to the contacting of fluids and particulate materials. Specifically, this invention relates to the internals of reactors used in the contact of fluids and solid particles. More specifically, this invention relates to the design of novel connectors for use in radial flow processes and apparatuses.

2. Description of the Related Art

A wide variety of industrial applications involves radial or horizontal flow apparatuses for contacting a fluid with a solid particulate. Representative processes include those used in the refining and petrochemical industries for hydrocarbon conversion, adsorption, and exhaust gas treatment. In reacting a hydrocarbon stream in a radial flow reactor, for example, the feed to be converted is normally at least partially vaporized when it is passed into a solid particulate catalyst bed to bring about the desired reaction. Over time, the catalyst gradually loses its activity, or becomes spent, due to the formation of coke deposits on the catalyst surface resulting from non-selective reactions and contaminants in the feed.

Moving bed reactor systems have therefore been developed for continuously or semi-continuously withdrawing the spent catalyst from the catalyst retention or contacting zone within the reactor and replacing it with fresh catalyst to maintain a required degree of overall catalyst activity. Typical examples are described in U.S. Pat. Nos. 3,647,680, 3,692,496, and 3,706,536. In addition, U.S. Pat. No. 3,978,150 describes a process in which particles of catalyst for the dehydrogenation of paraffins are moved continuously as a vertical column under gravity flow through one or more reactors having a horizontal flow of reactants. Another hydrocarbon conversion process using a radial flow reactor to contact an at least partially vaporized hydrocarbon reactant stream with a bed of solid catalyst particles is the reforming of naphtha boiling hydrocarbons to produce high octane gasoline. The process typically uses one or more reaction zones with catalyst particles entering the top of a first reactor, moving downwardly as a compact column under gravity flow, and being transported out of the first reactor. In many cases, a second reactor is located either underneath or next to the first reactor, such that catalyst particles move through the second reactor by gravity in the same manner. The catalyst particles may pass through additional reaction zones, normally serially, before being transported to a vessel for regeneration of the catalyst particles by the combustion of coke and other hydrocarbonaceous byproducts that have accumulated on the catalyst particle surfaces during reaction.

The reactants in radial flow hydrocarbon conversion processes pass through each reaction zone, containing catalyst, in a substantially horizontal direction in the case of a vertically oriented cylindrical reactor. Often, the catalyst is retained in the annular zone between an outer particle retention device (e.g., an inlet screen) and an inner particle retention device (e.g., an outlet screen). The devices form a flow path for the catalyst particles moving gradually downward via gravity, until they become spent and must be removed for regeneration. The devices also provide a way to distribute gas or liquid feeds to the catalyst bed and collect products at a common effluent collection zone. In the case of radial fluid flow toward the center of the reactor, for example, this collection zone may be a central, cylindrical space within the inner particle retention device. Regardless of whether the radial fluid flow is toward or away from the center, the passage of vapor is radially through one (outer or inner) retention device, the bed of catalyst particles, and through the second (inner or outer) retention device.

Radial flow reactor design typically requires that the pressure drop across the vessel be minimized. This requires the use of large diameter inlet and outlet nozzles. Two typical, but non-limiting, radial flow reactor configurations include a top inlet, inward radial flow reactor and a top inlet, outward radial flow reactor. Both reactor configurations may include an elbow connector, which joins the central conduit to the inlet nozzle (for outward radial flow), or the outlet nozzle (for inward radial flow). The requirement for large diameter nozzles necessitates a restricted space between the interior surface of the vessel wall and the outside diameter of the elbow connector joining the nozzle to the central conduit.

In order to inspect and maintain the vessel, a worker must be able to physically enter the vessel and then disconnect the elbow connector from the nozzle and central conduit. This type of maintenance is a challenge for typical radial flow reactor designs as a miter elbow needs to be removed from the reactor to access the inside of the center pipe, requiring disconnection (for example, by removing flange bolts or vessel shell welds) and removal of the upper portion of the vessel, which involves considerable downtime and expense. Therefore, one problem in the art is how to design radial flow reactors in order to improve accessibility during construction and maintenance of the vessels. Further, the mitered elbows in traditional radial flow reactors limit the possible location of vertical connecting flanges of the vapor transfer line, which in turn limits the possible locations of other reactor internals, such as, the transfer pipes.

SUMMARY OF THE INVENTION

Using a T-type connector to join the reactor top nozzle and the central conduit solves the aforementioned problems with radial flow reactor design. First, accessibility is improved through the use of interior flanges with bolting located on the inside of the various connections between the central conduit, connector and inlet/outlet (as opposed to standard, exterior flanges with bolting on the outside of the flange). Second, the T-type connector includes a passage to facilitate access to both the aforementioned connections and the central conduit itself.

According to an aspect, an apparatus for creating a fluid connection between a port in a wall of a reactor vessel and an axial flow path of the reactor vessel, the apparatus is provided. The apparatus includes a flow connector having a wall defining a flow path of the flow connector. The flow path terminates in a first end opening and a second end opening. The first end opening is configured to connect to the axial flow path of the reactor vessel and the second end opening is configured to connect to the port in a wall of the reactor. The flow connector includes a passageway extending through the wall of the flow connector to provide access to the flow path of the flow connector. The apparatus also includes a cover that is dimensioned for sealing the passageway.

According to an aspect, a system is provided for radial flow contact of a reactant stream with catalyst particles. The system includes a reactor vessel. The system also includes a flow connector having a wall defining a flow path. The flow path terminates in a first end opening and a second end opening. The first end opening is in fluid communication with an axial flow path of the reactor vessel. The second end opening is in fluid communication with a first port in a wall of the reactor. The flow connector includes a passageway extending through the wall of the flow connector to provide access to the flow path of the flow connector. The system further includes a cover dimensioned for sealing the passageway.

According to an aspect, a system for radial flow contact of a reactant stream with catalyst particles is provided. The system includes a reactor vessel. The system further includes a catalyst retainer disposed in the reactor vessel that has an inner particle retention device and an outer particle retention device. The inner particle retention device and the outer particle retention device are spaced apart to define a catalyst retaining space. The inner particle retention device defines the axial flow path of the reactor vessel. The outer particle retention device and an inner surface of a wall of the reactor vessel define an annular flow path of the reactor vessel. A flow connector has a wall defining a flow path of the flow connector that terminates in a first end opening and a second end opening. The first end opening is in fluid communication with an axial flow path of the reactor vessel. The second end opening is in fluid communication with a port in a wall of the reactor. The flow connector includes a passageway extending through the wall of the flow connector to provide access to the flow path of the flow connector. The system further includes a cover dimensioned for sealing the passageway.

These and other features, aspects, and advantages of the present invention will become better understood upon consideration of the following detailed description, drawings and appended claims.

DETAILED DESCRIPTION OF THE INVENTION

The features referred to in FIGS. 1-4 are not necessarily drawn to scale and should be understood to present an illustration of the invention and/or principles involved. Some features depicted have been enlarged or changed in view relative to others, in order to facilitate explanation and understanding. Particle retention devices such as screens, as well as radial flow fluid/solid contacting apparatuses and processes utilizing such apparatuses, as disclosed herein, will have configurations, components, and operating parameters determined, in part, by the intended application and also the environment in which they are used. The processes and apparatus described herein can be utilized in various hydrocarbon conversion processes. Some specific examples of hydrocarbon conversion processes are provided below.

In an example, the hydrocarbon conversion process is a reforming process. The reforming process is a common process in the refining of petroleum, and is usually used for increasing the amount of gasoline. The reforming process comprises mixing a stream of hydrogen and a hydrocarbon mixture and contacting the resulting stream with a reforming catalyst. The usual feedstock is a naphtha feedstock and generally has an initial boiling point of about 80° C. and an end boiling point of about 205° C. The reforming reactors are operated with a feed inlet temperature between 450° C. and 540° C. The reforming reaction converts paraffins and naphthenes through dehydrogenation and cyclization to aromatics. The dehydrogenation of paraffins can yield olefins, and the dehydrocyclization of paraffins and olefins can yield aromatics.

Reforming catalysts generally comprise a metal on a support. The support can include a porous material, such as an inorganic oxide or a molecular sieve, and a binder with a weight ratio from 1:99 to 99:1. The weight ratio is preferably from about 1:9 to about 9:1. Inorganic oxides used for support include, but are not limited to, alumina, magnesia, titania, zirconia, chromia, zinc oxide, thoria, boria, ceramic, porcelain, bauxite, silica, silica-alumina, silicon carbide, clays, crystalline zeolitic aluminasilicates, and mixtures thereof. Porous materials and binders are known in the art and are not presented in detail here. The metals preferably are one or more Group VIII noble metals, and include platinum, iridium, rhodium, and palladium. Typically, the catalyst contains an amount of the metal from about 0.01% to about 2% by weight, based on the total weight of the catalyst. The catalyst can also include a promoter element from Group IIIA or Group IVA. These metals include gallium, germanium, indium, tin, thallium and lead.

The hydrocarbon conversion process may be a dehydrocyclodimerization process wherein the feed comprises C2 to C6 aliphatic hydrocarbons which are converted to aromatics. Preferred feed components include C3 and C4 hydrocarbons such as isobutane, normal butane, isobutene, normal butene, propane and propylene. Diluents, e.g. nitrogen, helium, argon, and neon may also be included in the feed stream. Dehydrocyclodimerization operating conditions may include a reaction temperature from about 350° C. to about 650° C.; a pressure from about 0 kPa(g) to about 2068 kPa(g); and a liquid hourly space velocity from about 0.2 to about 5 hr −1. Preferred process conditions include a reaction temperature from about 400° C. to about 600° C.; a pressure from about 0 kPa(g) to about 1034 kPa(g); and a liquid hourly space velocity of from 0.5 to 3.0 hr −1. It is understood that, as the average carbon number of the feed increases, a reaction temperature in the lower end of the reaction temperature range is required for optimum performance and conversely, as the average carbon number of the feed decreases, the higher the required reaction temperature. Details of the dehydrocyclodimerization process are found for example in U.S. Pat. No. 4,654,455 and U.S. Pat. No. 4,746,763.

The dehydrocyclodimerization catalyst may be a dual functional catalyst containing acidic and dehydrogenation components. The acidic function is usually provided by a zeolite which promotes the oligomerization and aromatization reactions, while a non-noble metal component promotes the dehydrogenation function. Exemplary zeolites include ZSM-5, ZSM-8, ZSM-11, ZSM-12, and ZSM-35. One specific example of a catalyst disclosed in U.S. Pat. No. 4,746,763 consists of a ZSM-5 type zeolite, gallium and a phosphorus containing alumina as a binder. Multiple reactors or reaction zones may be used to manage the heat of reaction. The dehydrocyclodimerization process regeneration zone pressure may range from about 0 kPa(g) to about 103 kPa(g). In a particular embodiment, the regeneration conditions may include a step comprising exposing the catalyst to liquid water or water vapor as detailed in U.S. Pat. No. 6,657,096.

In an example, the hydrocarbon conversion process is a dehydrogenation process for the production of olefins from a feed comprising a paraffin. The feed may comprise C2 to C30 paraffinic hydrocarbons and in a preferred embodiment comprises C2 to C5 paraffins. General dehydrogenation process conditions include a pressure from about 0 kPa(g) to about 3500 kPa(g); a reaction temperature from about 480° C. to about 760° C.; a liquid hourly space velocity from about 1 to about 10 hr −1; and a hydrogen/hydrocarbon mole ratio from about 0.1:1 to about 10:1. Dehydrogenation conditions for C4 to C5 paraffin feeds may include a pressure from about 0 kPa(g) to about 500 kPa(g); a reaction temperature from about 540° C. to about 705° C.; a hydrogen/hydrocarbon mole ratio from about 0.1:1 to about 2:1; and an LHSV of less than 4. Additional details of dehydrogenation processes and catalyst may be found for example in U.S. Pat. No. 4,430,517 and U.S. Pat. No. 6,969,496.

Generally, the dehydrogenation catalyst comprises a platinum group component, an optional alkali metal component, and a porous inorganic carrier material. The catalyst may also contain promoter metals and a halogen component which improve the performance of the catalyst. In an embodiment, the porous carrier material is a refractory inorganic oxide. The porous carrier material may be an alumina with theta alumina being a preferred material. The platinum group includes palladium, rhodium, ruthenium, osmium and iridium and generally comprises from about 0.01 wt % to about 2 wt % of the final catalyst with the use of platinum being preferred. Potassium and lithium are preferred alkali metal components comprising from about 0.1 wt % to about 5 wt % of the final catalyst. The preferred promoter metal is tin in an amount such that the atomic ratio of tin to platinum is between about 1:1 and about 6:1. A more detailed description of the preparation of the carrier material and the addition of the platinum component and the tin component to the carrier material may be obtained by reference to U.S. Pat. No. 3,745,112. The dehydrogenation process regeneration zone pressure may range from about 0 kPa(g) to about 103 kPa(g).

Aspects of the invention relate to novel T-type connectors for use in apparatuses for contacting fluids (e.g., gases, liquids, or mixed phase fluids containing both gas and liquid fractions) with solids that are typically in particulate form (e.g., spheres, pellets, granules, etc.). The maximum dimension (e.g., diameter of a sphere or length of a pellet), for an average particle of such particulate solids, is typically in the range from about 0.5 mm (0.02 inches) to about 15 mm (0.59 inches), and often from about 1 mm (0.04 inches) to about 10 mm (0.39 inches). An exemplary solid particulate is a catalyst used to promote a desired hydrocarbon conversion reaction and normally containing a catalytically active metal or combination of metals dispersed on a solid, microporous carrier. Catalysts and other solid particulates are retained in particle retention devices when the smallest widths of the flow channels, for passage of fluid in the radial direction, are less than the smallest dimension (e.g., diameter of a sphere or diameter of the base of a pellet), for an average particle of a particulate solid. Typical smallest or minimum flow channel widths (e.g., formed as gaps or openings between adjacent, spaced apart profile wires or windings of profile wires) are in the range from about 0.3 mm (0.01 inches) to about 5 mm (0.20 inches), and often from about 0.5 mm (0.02 inches) to about 3 mm (0.12 inches). A representative apparatus containing a particle retention device according to the present invention is therefore a radial flow reactor that may be used in a number of chemical reactions including hydrocarbon conversion reactions such as catalytic dehydrogenation and catalytic reforming.

Use of the term "particle retention device" is understood to refer to devices that retain, or restrict the flow of, a solid particulate in at least one direction (e.g., radially), but do not necessarily immobilize the solid particulate. In fact, contemplated applications of the particle retention devices include their use in radial flow reactors in which the solid particulate, often a catalyst used to promote a desired conversion, is in a moving bed that allows the catalyst to be intermittently or continuously withdrawn (e.g., for regeneration by burning accumulated coke) and replaced in order to maintain a desired level of catalytic activity in the reactor. Therefore, the particle retention device may, for example, confine the catalyst in the radial direction (e.g., from the center of the reactor to an outer radius of a cylindrical retention zone or otherwise between an inner radius and an outer radius of an annular retention zone) but still allow the catalyst to move axially in the downward direction.

As discussed above, however, the use of both outer and inner particle retention devices can be advantageous for not only distributing the inlet fluid such as a hydrocarbon-containing feed stream to, but also for collecting the outlet fluid such as a hydrocarbon-containing product stream as it exits the particle retention zone. Particle retention devices described herein can also be combined with conventional screens, for example, in the case of radial fluid flow toward the central axis of the vessel, an outer particle retention device as described herein may be used to effectively distribute the inlet fluid feed, and a conventional inner screen may be used to collect outlet fluid product, whereby solid particulate is retained in an annular particle retention zone between the outer particle retention device and the screen.

Representative embodiments of the invention are directed to radial flow reactors, including moving bed reactors, comprising a vessel, a particle retention device and a novel T-type connector, as described herein, that is disposed in the vessel to promote ease of access for inspection and maintenance of the vessel internals. In many cases, the T-type connector will be T-shaped with cylindrical arms or connections. Other connector geometries, for example, a connector with a rectangular cross-section, are possible.

Figure 1:
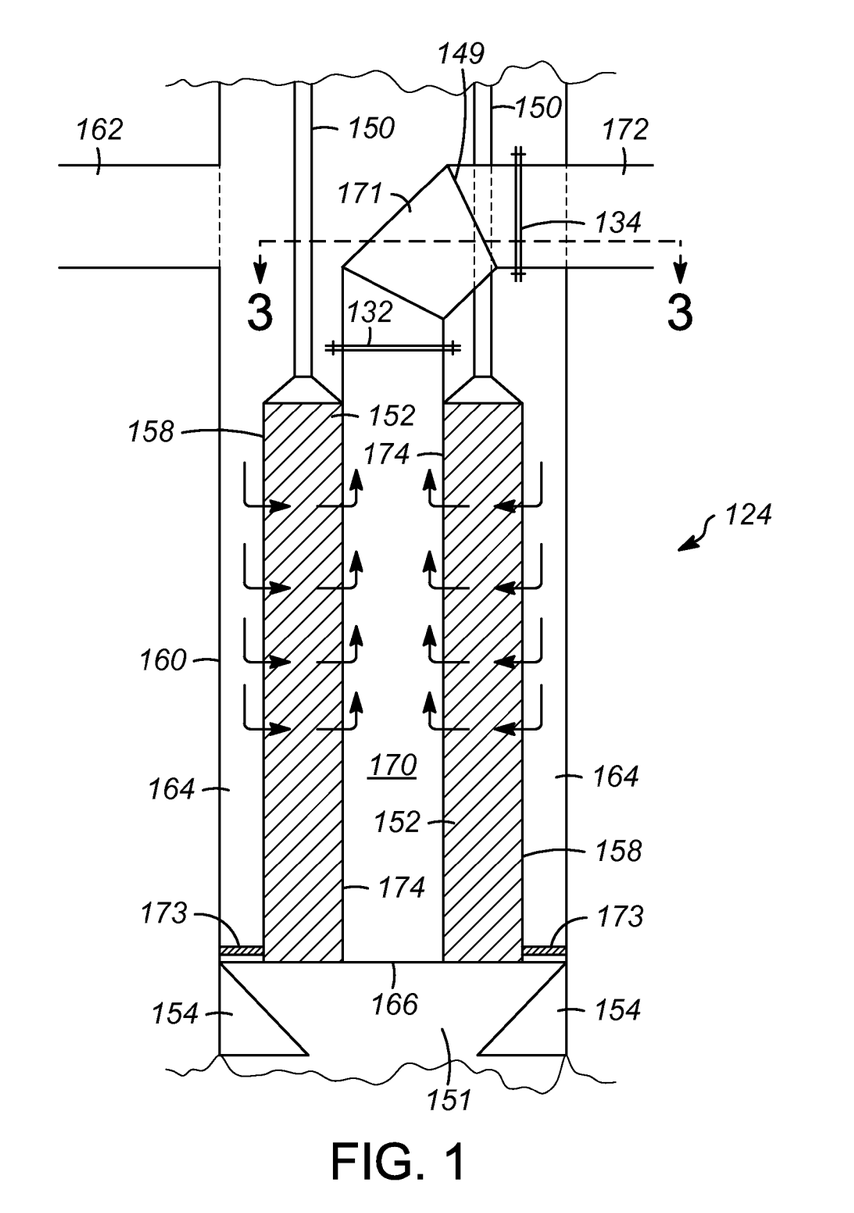
FIG. 1 is a cross-sectional profile of a top-inlet radial flow reactor with inward radial flow and having an outlet nozzle in communication with the central conduit via an elbow connection'
Figure 2:
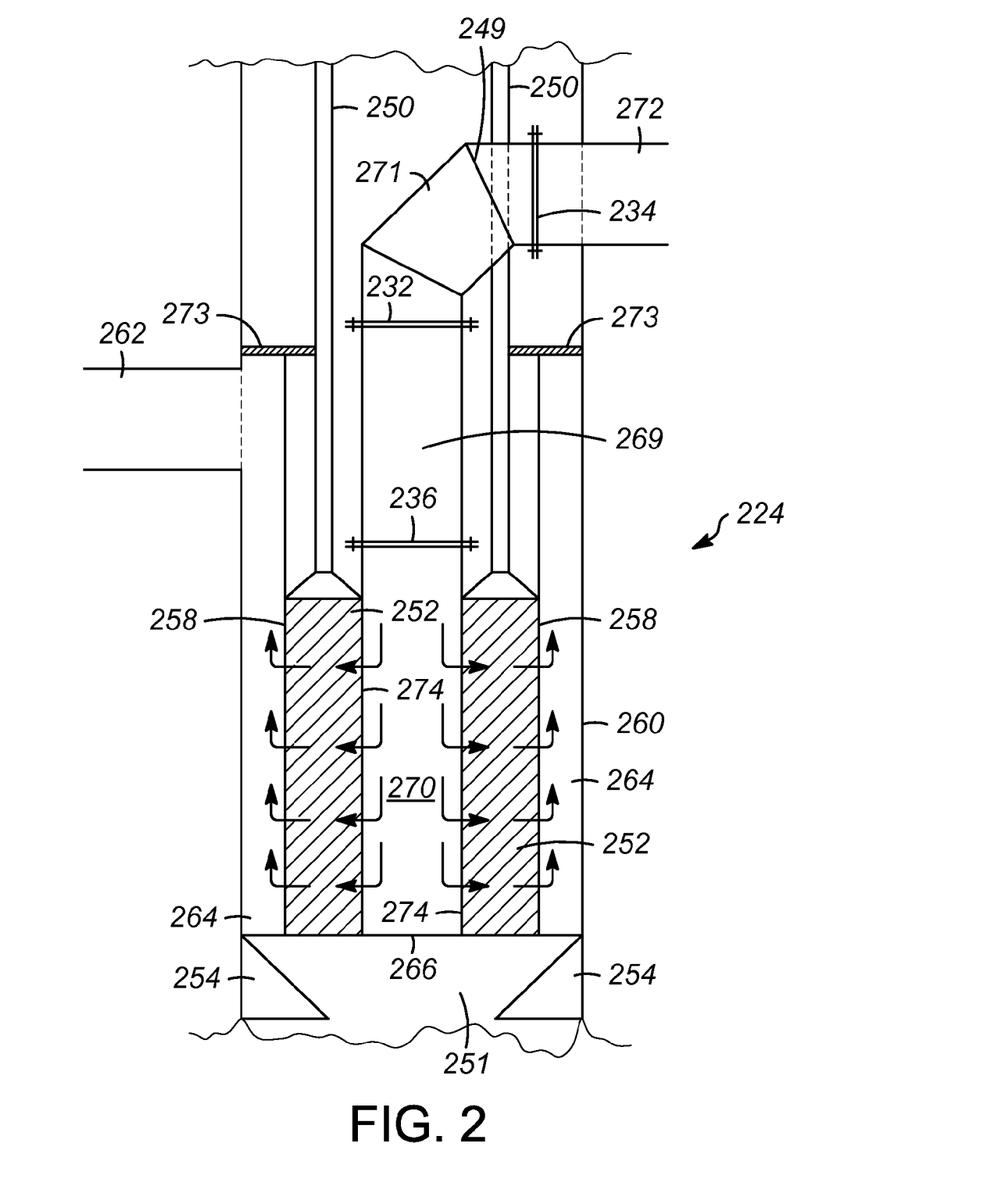
FIG. 2 is a cross-sectional profile of a top-inlet radial flow reactor with outward radial flow and having an inlet nozzle in communication with the central conduit via an elbow connection.

Referring now to the Figures, like elements are indicated with like numbers between FIGS. 1-4 with the 100 series elements of FIG. 1 analogous to the 200 series elements of FIG. 2, and so forth. For example, central conduit 170 in FIG. 1 is analogous to central conduit 270 in FIG. 2, etc. Certain exceptions to the aforementioned numbering scheme are specifically noted where elements may not be analogous.

FIGS. 1 and 2 show a sectional view of a typical top-inlet inward radial flow reactor and a top-inlet outward radial flow reactor, respectively. An understanding of the construction and operation of a typical top-inlet inward/outward radial flow reactor provides context and motivation for replacing the typical elbow fitting, which connects the central conduit with the inlet (outward radial flow) or outlet (inward radial flow) nozzle, with the novel T-type connection of the present invention. Referring first to FIG. 1, catalyst particles (not shown) are transferred by a series of transfer conduits 150 into a particle retaining space 152 in the interior space of the vessel 124. A bed of catalyst particles is formed in retaining space 152 immediately below the lower extent of transfer conduits 150. A vessel partition 154 defines a catalyst collection space 151 below the lower extent of retaining space 152 and the catalyst bed. An inner particle retention device 174 and an outer particle retention device 158 define the extent of the catalyst bed in retaining space 152, which has a generally annular cross section. Catalyst particles are withdrawn from the bottom of retaining space 152 into the catalyst collection space 151 and then through another series of transfer conduits (not shown) that transfer the catalyst particles from the vessel 124.

The reactant stream enters the vessel 124 through a nozzle 162 and flows into an outer chamber 164 defined by an interior surface of the outer wall 160 of the vessel 124 and an exterior surface of the outer particle retention device 158. A base plate 166 extends across the bottom of chamber 164 to separate it from the catalyst collection space 151. Chamber 164 communicates the reactants with the interior of the retaining space 152 through the outer particle retention device 158. The reactants pass across retaining space 152, through the inner particle retention device 174, and are collected by a central conduit 170 defined by the interior space of the inner particle retention device 174. Central conduit 170 has a closed bottom and transports the effluent vapors from retaining space 152 upward and out of the vessel 124 through a nozzle 172 via elbow connector 171. Elbow connector 171 may be joined to central conduit 170 and outlet nozzle 172 by various means. One possible means would be the use of an elbow connector 171, which is flanged, such as a standard, exterior flange that is bolted on the outside. The vessel 124 of FIG. 1 is depicted with an exterior flange 132 for connection to the central conduit 170 and an exterior flange 134 for connection to the outlet nozzle 172.

Means are provided for supporting the particle retention devices 158 and 174 in place within the vessel 124. The particle retention devices 158 and 174 may be supported from the bottom. For example, in FIG. 1, a support 173 positioned near the bottom of the vessel 124 contacts the lower end of the outer particle retention device 158 in order to hold the outer particle retention device 158 in place.

Flow arrows in the Figures illustrate radial fluid flow through inner and outer particle retention devices (e.g., 174, 158 in FIG. 1), and also through catalyst particle retaining space (e.g., 152 in FIG. 1), but an overall axial flow of feed distributed to, and product collected from, the particle retaining space (e.g., 152 in FIG. 1).

FIG. 2 shows a sectional view of an embodiment of a typical top-inlet outward radial flow reactor. The construction and operation of the top-inlet outward radial flow reactor of FIG. 2 share several similarities with the top-inlet inward radial flow reactor depicted in FIG. 1. For example, catalyst particles (not shown) are transferred by a series of transfer conduits 250 into a particle retaining space 252 in the interior space of the vessel 224. A bed of catalyst particles is formed in retaining space 252 immediately below the lower extent of transfer conduits 250. A vessel partition 254 defines a catalyst collection space 251 below the lower extent of retaining space 252 and the catalyst bed. An inner particle retention device 274 and an outer particle retention device 258 define the extent of the catalyst bed in retaining space 252, which has a generally annular cross section. Catalyst particles are withdrawn from the bottom of retaining space 252 into the catalyst collection space 251 and then through another series of transfer conduits (not shown) that transfer the catalyst particles from the vessel 224.

The differences between the vessels 124 and 224 of FIGS. 1 and 2, respectively, include the location and elevation of the inlet and outlet nozzles, and the design of supports for the particle retention devices. Referring again to FIG. 2, the reactant stream enters the vessel 224 through a nozzle 272. The reactant stream passes from the nozzle 272 into the central conduit 270 via elbow connector 271 and intermediate conduit 269. Elbow connector 271 may be joined to intermediate conduit 271 and inlet nozzle 272 by various means. The vessel 224 of FIG. 2 is depicted with an exterior flange 232 for connection to the intermediate conduit 271 and an exterior flange 234 for connection to the inlet nozzle 272. Furthermore, intermediate conduit 272 may be joined to central conduit 270 with connection means such as external flange 236.

The central conduit 270 is defined by the interior space of the inner particle retention device. A base plate 266 extends across the bottom of central conduit 270 to separate it from the catalyst collection space 251. The conduit 270 communicates the reactants with the interior of the retaining space 252 through the inner particle retention device 274. The reactants pass across the retaining space 252, through the outer particle retention device 258, and are collected in an outer chamber 264, which is defined by an interior surface of the outer wall 260 of the vessel 224 and an exterior surface of the outer particle retention device 258. Outer chamber 264 has a closed bottom defined by base plate 266 and transports the effluent vapors from retaining space 252 upward and out of the vessel 224 through a nozzle 262.

Another difference between the radial flow reactor of FIG. 1 and the radial flow reactor of FIG. 2 is the inlet nozzle 272 is positioned at a higher elevation than the outlet nozzle 262. The outlet nozzle 262 may be positioned above the catalyst retaining space 252, as illustrated in FIG. 2, or lower at a position generally adjacent to the catalyst retaining space. Means are provided for supporting the particle retention devices 258 and 274 in place within the vessel 224. However, based on the configuration of the inlet and outlet nozzles 272, 262 of a top-inlet outward radial flow reactor of the present invention, the particle retention devices 258 and 274 may be supported from the top. For example, in FIG. 2, a support 273 positioned near the top of the vessel 224 contacts the upper end of the outer particle retention device 258 in order to hold the outer particle retention device 258 in place.

For radial flow reactors, and particularly in reforming reactors, it is usually desirable to limit pressure drop across the vessel 124, 224. Furthermore, in fluid particle contacting in general, it is preferred to avoid excessive pressure drop through fluid distributors. For example, it is known in the art that appreciable pressure drops will form fluid jets that can impinge upon and damage the contacted particles. One advantage of the design and operation of the vessel 224 of FIG. 2 results from the outward radial flow of the reactant stream. First, as the volume that may be occupied by the reactant stream increases in the outward radial direction, the linear flow rate of the reactant stream is lower at the surface of the outer particle retention device 258 as compared with the surface of the inner particle retention device 274. Therefore, potential issues with catalyst pinning are alleviated as compared with an inward radial flow reactor design.

Another advantage of the outward radial flow scheme relates to wear and tear on the vessel 124, 224. Catalyst particles will collide with the particle retention device in the direction of flow of the reactant stream. For inward radial flow, catalyst particles collide more frequently with the surface of the inner particle retention device 274. However, for outward radial flow, as the surface area of the outer particle retention device 258 is greater than the surface area of the inner particle retention device 274, wear and tear due to catalyst particles colliding with the surface of the outer particle retention device is distributed over a greater area, thereby increasing the amount of time the vessel 224 may be operated before maintenance is required.

Figure 3:
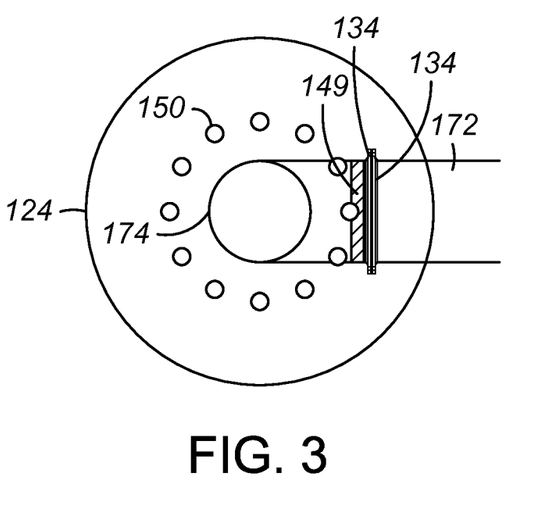
FIG. 3 is a cross-sectional plan view of a radial flow reactor taken along lines 3-3 of FIG. 2.

FIG. 3 illustrates a cross-sectional plan view of the reactor of FIG. 1 taken along line 3-3. While FIG. 3 will be described with regard to the reactor of FIG. 1, it should be understood that the reactor of FIG. 2 has a similar arrangement of the elements described with regard to FIG. 3. As illustrated in FIG. 3, a plurality of transfer pipes 150 are arranged about the generally central inner particle retention device 174. The inlet nozzle 172 as illustrated includes the miter elbow 171 providing communication between the inlet nozzle 172 and the inner particle retention device. As the inlet nozzle 172 has a relatively large diameter, one or more of the catalyst transfer pipes 150 typically passes through a portion thereof, as shown. The miter elbow 171 includes one or more welds 149 for connecting portions of the elbow. Due to the welds 149 and the configuration of the miter elbow 171, the flange 134 is located at a relatively large distance from a central portion of the vessel 124. Because the transfer pipes 150 typically cannot pass through a weld 149 or flange 134, the positioning of the transfer pipes 150 passing through the inlet 172 is limited, typically radially outside of the flange 134. The arrangement of the miter elbow illustrated in FIGS. 1-3 may also restrict the design and location of other reactor internals as well.

Figure 4:
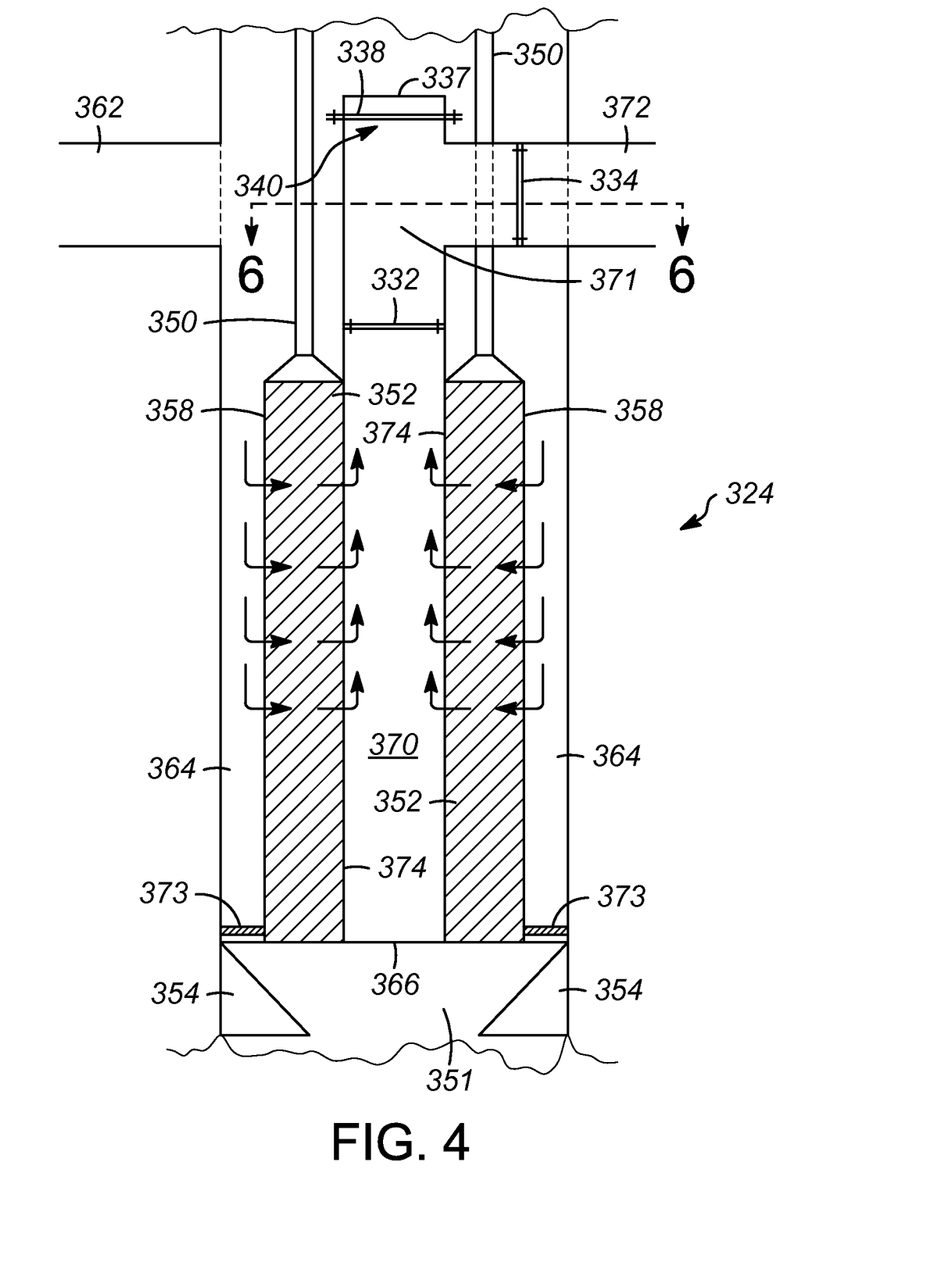
FIG. 4 is a cross-sectional profile of a top-inlet radial flow reactor with inward radial flow and having an outlet nozzle in communication with the central conduit via a T-type connection of the present invention.
Figure 5:
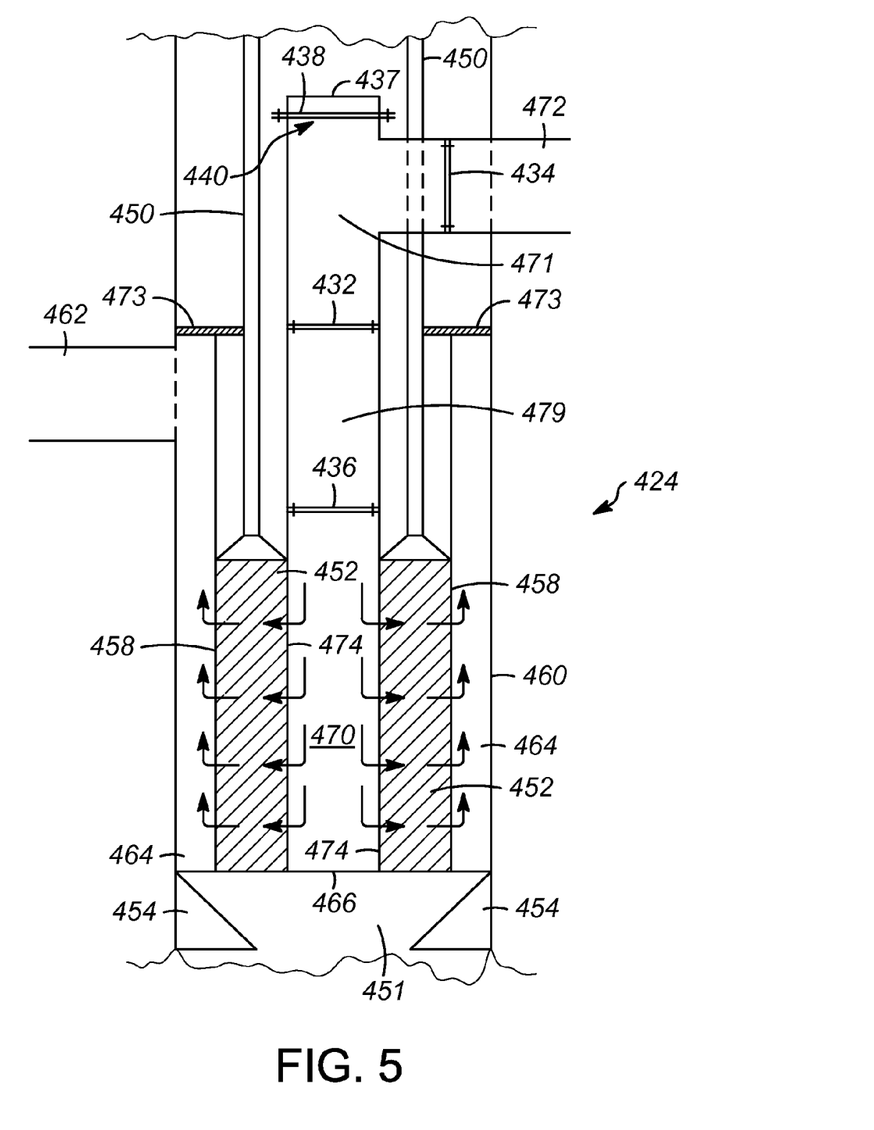
FIG. 5 is a cross-sectional profile of a top-inlet radial flow reactor with outward radial flow and having an inlet nozzle in communication with the central conduit via a T-type connection of the present invention.

FIGS. 4 and 5 show a sectional view of a top-inlet inward radial flow reactor and a top-inlet outward radial flow reactor, respectively. The reactors in FIGS. 4 and 5 each show a possible implementation of the novel T-type connection. Referring to FIG. 4, operation and design of the vessel 324 is similar to the vessel 124 of FIG. 1. The reactor of FIG. 4 implements a T-type connector 371, which joins the central conduit 370 to the outlet nozzle 372. The T-type connector 371 may include connection means such as flanges, socket joints, butt welds and the like. In FIG. 4, the T-type connector 371 includes an interior flange 332 for connection to the central conduit 370 and an interior flange 334 for connection to the outlet nozzle 372 which has an inside diameter in the range of 1 feet to 15 feet. The interior flanges 332, 334 may be bolted on the inside as opposed to a traditional exterior flange. The inside diameter of the T-type connector 371 where the interior flanges 332, 334 are located is in the range of 1 feet to 15 feet. The T-type connector 371 may further include a resealable passage 340 having an inside diameter in the range of 1 feet to 15 feet. The passage 340 may be resealable with cover 337, wherein the cover 337 is connected to the T-type connector 371 with an exterior flange 338. Pipes 371 and 372 may include a variety of cross-sectional shapes, including but not limited to circular, square, rectangular, and elliptical.

Referring to FIG. 5, operation and design of the vessel 424 is similar to the vessel 224 of FIG. 2. The reactor of FIG. 4 implements a T-type connector 471, which joins the intermediate conduit 479 to the inlet nozzle 472. In turn, intermediate conduit 479 is joined to central conduit 470. The T-type connector 471 may include connection means such as flanges, socket joints, butt welds, and the like. In FIG. 5, the T-type connector 471 includes an interior flange 432 for connection to the intermediate conduit 479 and an interior flange 434 for connection to the inlet nozzle 472. Intermediate conduit 479 also includes an interior flange 436 for connection to central conduit 470. The interior flanges 432, 434, 436 may be bolted on the inside as opposed to an exterior flange. The T-type connector 471 may further include a resealable passage 440. The passage 440 may be resealable with cover 437, wherein the cover 437 is connected to the T-type connector 471 with an exterior flange 438.

Using a T-type connector 371, 471 results in an improvement to the top-inlet inward radial flow reactor and top inlet outward radial flow reactor designs of FIGS. 4 and 5, respectively, as well as other reactor configurations not described herein, including, but not limited to bottom inlet and/or outlet inward or outward radial flow reactors. In FIG. 4, accessibility is improved through the use of interior flanges 332, 334 and passage 340 to facilitate access to the interior flanges 332, 334 and the central conduit 370 itself. For example, the central conduit may be accessed by removing the cover 337 rather than disconnecting and removing the top of the reactor vessel as was necessary in the designs illustrated in FIGS. 1-3 in order to remove the miter elbow. Similarly, in FIG. 5, accessibility is improved through the use of interior flanges 432, 434, 436 and passage 440 to facilitate access to the interior flanges 432, 434, 436 and the central conduit 470 itself.

Figure 6:
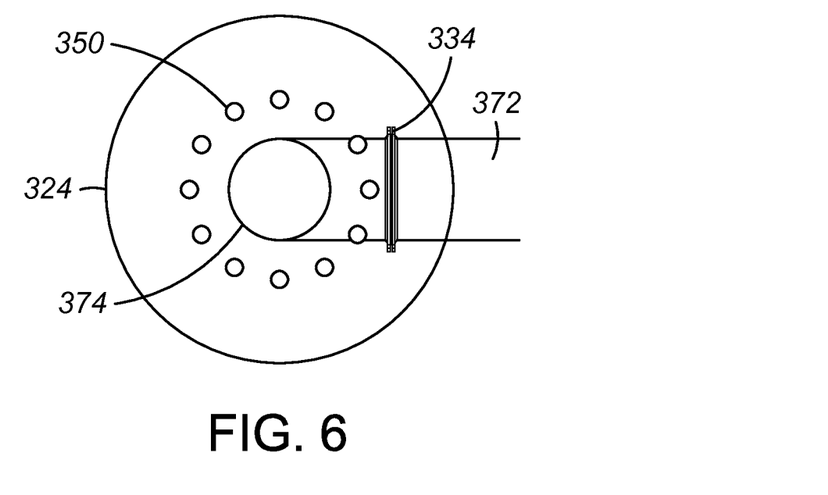
FIG. 6 is a cross-sectional plan view of a radial flow reactor taken along lines 6-6 of FIG. 4.

Further, referring to FIG. 6, because there is no inclined miter elbow, the possible locations of the flange 334 and 434 are increased, providing for improved reactor internals design, for example the location of the catalyst transfer pipes 350. For example, as illustrated in FIG. 6, the T-type connector 371 may avoid the need for a weld that is offset radially outward from the central conduit 370. Similarly, the flange 334 or other connector may be located at different radial positions, including closer to the central conduit 370 than what was possible in the designs of FIGS. 1-3. For these reasons, greater freedom is provided for designing the reactor internals, including the transfer pipes 350 and 450, which can be positioned further radially inward than in previous designs.

Overall, aspects of the invention are associated with novel T-type connectors for use in radial flow reactors and regenerators. While use of the radial flow apparatus is not limited to any process, the radial flow apparatus can be particularly beneficial in: (i) the catalytic reforming of a hydrocarbon feedstream (e.g., a naphtha feedstream) to produce aromatics (e.g., benzene, toluene and xylenes) (see, e.g., U.S. Patent Application Publication Nos. 2012/0277501, 2012/0277502, 2012/0277503, 2012/0277504, and 2012/0277505); and (ii) the catalytic dehydrogenation of a paraffin stream to yield olefins (see, e.g., U.S. Pat. No. 8,282,887).

Those having skill in the art, with the knowledge gained from the present disclosure, will recognize that various changes could be made in the above devices, as well as radial flow fluid/solid contacting apparatuses and processes utilizing these devices, without departing from the scope of the present disclosure. Therefore, the scope of the appended claims should not be limited to the description of the embodiments contained herein.

What is claimed is:

1. A system for radial flow contact of a reactant stream with catalyst particles, the system comprising:
   a reactor vessel;
   a flow connector having a wall defining a flow path of the flow connector, the flow path terminating in a first end opening and a second end opening, the first end opening in fluid communication with an axial flow path of the reactor vessel, the second end opening in fluid communication with a first port in a wall of the reactor, the flow connector including a passageway extending through the wall of the flow connector to provide access to the flow path of the flow connector wherein the first port is an inlet nozzle that is in fluid communication with a source of a reactant stream; and
   a cover dimensioned for sealing the passageway wherein said cover separates a product stream from a feed stream;
   a catalyst retainer disposed in the reactor vessel, the catalyst retainer including an inner particle retention device and an outer particle retention device, the inner particle retention device and the outer particle retention device being spaced apart to define a catalyst retaining space of the catalyst retainer, the inner particle retention device defining the axial flow path of the reactor vessel, the outer particle retention device and an inner surface of a wall of the reactor vessel defining an annular flow path of the reactor vessel and a base plate separating the reactants from a catalyst collection space.

2. The system of claim 1, wherein a single inlet nozzle is in fluid communication with the axial flow path of the reactor vessel.

3. The system of claim 1, further comprising a second port in fluid communication with the annular flow path of the reactor vessel;
   wherein the first port is at a higher elevation than the second port.

4. The system of claim 1, further comprising a second port in fluid communication with the annular flow path of the reactor vessel;
   wherein the first port is at about the same elevation as the second port.

5. The system of claim 1, wherein the passageway is dimensioned such that a person may traverse the passageway to access the flow path of the flow connector.

* * * * *